United States Patent [19]

Kulibert et al.

[11] Patent Number: 4,816,355

[45] Date of Patent: Mar. 28, 1989

[54] SEAL FOR ALKALINE PRIMARY BATTERY

[75] Inventors: Gregory S. Kulibert, Oshkosh; Kenneth H. Kenyon, Verona, both of Wis.

[73] Assignee: Rayovac Corporation, Madison, Wis.

[21] Appl. No.: 166,752

[22] Filed: Feb. 24, 1988

Related U.S. Application Data

[63] Continuation-in-part of Ser. No. 39,788, Apr. 16, 1987, abandoned, which is a continuation of Ser. No. 893,535, Aug. 5, 1986, abandoned, which is a continuation of Ser. No. 641,739, Aug. 17, 1984, abandoned.

[51] Int. Cl.⁴ .......................................... H01M 10/24
[52] U.S. Cl. .................................... 429/174; 429/165; 429/185; 29/623.2
[58] Field of Search ................. 429/57, 174, 185, 164, 429/165, 206; 29/623.2

[56] References Cited

U.S. PATENT DOCUMENTS 3,042,734  7/1962  Carmichael et al. ............... 429/174
3,663,301  5/1972  Ralston et al. ...................... 429/165
3,764,392  10/1973  Kuwazaki et al. .................. 429/165
4,220,695  9/1980  Ishida et al. ......................... 429/185

FOREIGN PATENT DOCUMENTS 0037121  10/1981  European Pat. Off. ........... 429/185
0081201  6/1983  European Pat. Off. ............. 429/57
0007536  1/1979  Japan ................................ 429/174
0010934  1/1979  Japan ................................ 429/174
0010931  1/1979  Japan ................................ 429/174
0011442  1/1979  Japan ................................ 429/174
5009371  1/1980  Japan ................................ 429/185

Primary Examiner—Donald L. Walton
Attorney, Agent, or Firm—Kenyon & Kenyon

[57] ABSTRACT

The leakage of electrolyte from alkaline primary batteries is substantially reduced by improving the seal in such batteries. The novel seal is formed by applying a hard, tackless conductive alkali-resistant plastic coating to the surface of the metal container which forms a bond between the metal container and the sealant covered seal member normally used in such batteries.

23 Claims, 2 Drawing Sheets

SEAL FOR ALKALINE PRIMARY BATTERY

This application is continuation-in-part of Ser. No. 039,788, filed Apr. 16, 1987, which was a continuation of Ser. No. 893,535, filed Aug. 5, 1986, which was a continuation of Ser. No. 641,739, filed Aug. 17, 1984, all now abandoned.

FIELD OF THE INVENTION

The invention relates to alkaline primary batteries and, in particular, to an improved seal which reduces the leakage of electrolyte and extends the life thereof.

BACKGROUND OF THE INVENTION

Alkaline primary batteries and, in particular, alkaline manganese dioxide/zinc dry cells ($MnO_2/Zn$), have been a successful commercial development. When manufactured in a cylindrical configuration, the battery seal is typically made by compressing a plastic member (gasket) within a metal can by crimping the open end of the can as disclosed by Ralston and Ko in U.S. Pat. No. 3,663,301. More particularly, in the typical commercial alkaline primary batteries, the battery seal comprises the nickel plated steel can, i.e., the positive current collector, a plastic seal member, typically of nylon or polypropylene, and a sealant between the metal can and the plastic seal member. However, cells constructed according to the disclosure of Ralston and Ko are susceptible to electrolyte leakage. Such leakage usually occurs at the interface of the gasket and the metal can and is due to the propensity of alkaline electrolytes to wet metal surfaces.

To reduce the leakage of electrolyte from alkaline cells, sealant materials are used between the gasket and the metal surface. Typically asphaltic compounds such as bitumen are used. However, such seals are only marginally satisfactory, and then only when the steel cans are plated with nickel. When the steel can is unplated, such seals are very poor. The poorer seals noticed with unplated steel cans are probably due to differences in the bonding strength of bitumen to steel and bitumen to nickel-plated steel.

Others, attempting to improve upon the seals of alkaline batteries have used sealants consisting of fatty polyamides, e.g., U.S. Pat. No. 3,922,178 to Winger, cured epoxy-polyamine resins, e.g., U.S. Pat. No. 3,713,896 to Feldhake, or both bitumen and fatty polyamide resins, e.g., Japanese patent Application No. J5-4007-536. However, as explained in U.S. Pat. No. 4,282,293 to van Lier, all of these solutions have the same drawback—leakage still occurs since these materials do not always completely seal the interface of the metal surface and the gasket. It is hypothesized that leakage results from the inability of the sealant, or sealants, to adequately bond to the metal surface. Moreover, sealants such as bitumen and fatty polyamides are soft, somewhat tacky materials at and above room temperature and so are subject to damage and contamination during the assembly of electrochemical cells. Even cured epoxy-polyamine resins, though non-tacky, are relatively soft and can cause problems during cell assembly.

The battery seal set forth in U.S. Pat. No. 4,282,293 solves many of the processing problems as described above. However, as with cells incorporating bitumen and polyamides in the seal area, extreme care must be taken to confine the organosilane resin of the van Lier patent to the immediate area of the seal, otherwise the electrical operation of the cell will be adversely affected by the introduction of a non-conductive layer between the electrode and current collector.

It is a primary object of the present invention to provide for a stronger seal for alkaline cylindrical cells.

Another object of the present invention is to provide for strong seals in alkaline cylindrical cells wherein the metal cans, i.e., the positive current collectors, are unplated steel.

Still another object of the present invention is to provide for a strong seal in an alkaline cylindrical cell which is easy to make and is compatible with the alkaline cylindrical cell assembly process.

The foregoing and additional objects will become more fully apparent with the following description.

SUMMARY OF THE INVENTION

An alkaline battery seal comprising a sealant, such as bitumen and/or fatty polyamides, compressed between a plastic seal disk and a steel current collector coated on its inner surface with a hard, non-tacky, conductive, filled plastic film. Such a battery seal allows for simplified construction of alkaline batteries and substantially reduces electrolyte leakage from such cells.

DETAILED DESCRIPTION OF THE INVENTION

The objects of the present invention are achieved by applying a conductive filled polymeric resin to the surface of the metal container (positive current collector) in the area of the battery seal. The resulting thin conductive plastic film, which may extend between container and the cell cathode, forms a bond between the metal container and the sealant conventionally used in battery seals. By practicing the present invention, the positive current collector can be unplated steel, which reduces the cost of manufacturing alkaline cylindrical cells. Since the coating of the present invention is conductive, the problem of previous battery seal methods which require the sealants and any seal area coatings to be confined to the seal area is avoided. And since the coating is non-tacky, alkaline batteries using the present invention are easier to manufacture.

In accordance with the present invention, the interior surface of the metal can of an alkaline dry cell is coated with a conductive polymeric primer. This primer, which may be applied by various techniques, including painting, spraying or dipping, contains an alkaline resistant organic binder dissolved in a compatible solvent. Spraying is the preferred method of applying the organic primer.

After being applied to the metal can, the primer is dried at elevated temperatures, which permits the evaporation of the solvent and allows for the adhesion of a thin, non-tacky conductive resin coating to the metal container. The resulting coating is typically 0.0006 inches to 0.0008 inches in thickness, but may range from 0.0001 inches to 0.002 inches in thickness.

In the present invention, the binder is a film forming polymer which is compatible with alkaline battery components. Film forming binders which dissolve, hydrolyze or oxidize in the presence of the electrolyte cannot be used in practicing the present invention. The present invention can be successfully practiced with a wide range of polymeric binders including ABS (acrylonitrile butadiene styrene), PVC (polyvinyl chloride), epoxies, fluorocarbons, nylons, polypropylene, polybutylene, polystyrenes and neoprenes. The present invention may also be practiced with binders which are rubbers and/or elastomers, such as, isobutylene, isoprene, chloroprene, polysulfide, ethylene propylene, chlorinated and chlorosulfonated polyethylene, fluorosilicone and propylene oxide. However, materials which are soluble in KOH, the usual electrolyte found in alkaline battery systems, such as CMC, should not be used in practicing the present invention.

To practice the present invention, the solvent portion of the resin must be compatible with and wet the surface of the metal container. The solvent must also be compatible with the binder. The present invention can be successfully practiced with solvents such as ethyl acetate, butanol, methyl ethyl ketone, methyl isobutyl ketone and paraffinic hydrocarbon liquids.

The polymeric resins of the present invention contain conductive filler materials such as carbon. When carbon is added as the conductive filler, the weight percent of carbon in the film after the evaporation of the solvent must be less than 40. Increasing the amount of carbon, which reduces the amount of binder in the plastic film, decreases the mechanical integrity of the plastic film and increases the probability that the conductive film will not remain adhered to the surface of the metal container.

The presence of carbon in the film increases the hardness of the film while further decreasing it tackiness, thereby causing the film to be more easily handled during the alkaline battery manufacturing processes. For example, since the conductive film of the present invention has a tack-free surface, it exhibits almost no resistance to the insertion of the cathode, thereby simplifying the assembly of alkaline batteries. Moreover, since the coating of the present invention improves the adhesion of the sealant to the metal container surface, the application of the conventional sealant, such as bitumen, is less critical with respect to the wetting of the metal surface and so it may be applied using techniques compatible with the presence of one or several of the anode, separator and cathode within the metal container. Thus the bitumen may be applied as a thin bead around the inside of the container only partly covering the seal area to avoid contamination of the other battery parts. Insertion of the plastic sealing disk will then smear the bitumen over the seal area an adhere the sealing disk to the coating. This method avoids the problem of having to coat the sealing disk and process it with a tacky bitumen coated surface.

In order to provide the advantages disclosed herein the plastic film must be impervious to the alkaline electrolyte. Therefore, the plastic film must be continuous in the area of the sealant and metal container interface, but it need not be pore-free. In otherwords, while the plastic film may contain pores which allow for alkaline electrolyte to contact the steel container, the pores are sufficiently discontinuous such that there are no channels formed to allow electrolyte to pass from the interior of the battery to the open end of the container.

DESCRIPTION OF PREFERRED EMBODIMENT

Figure 1:
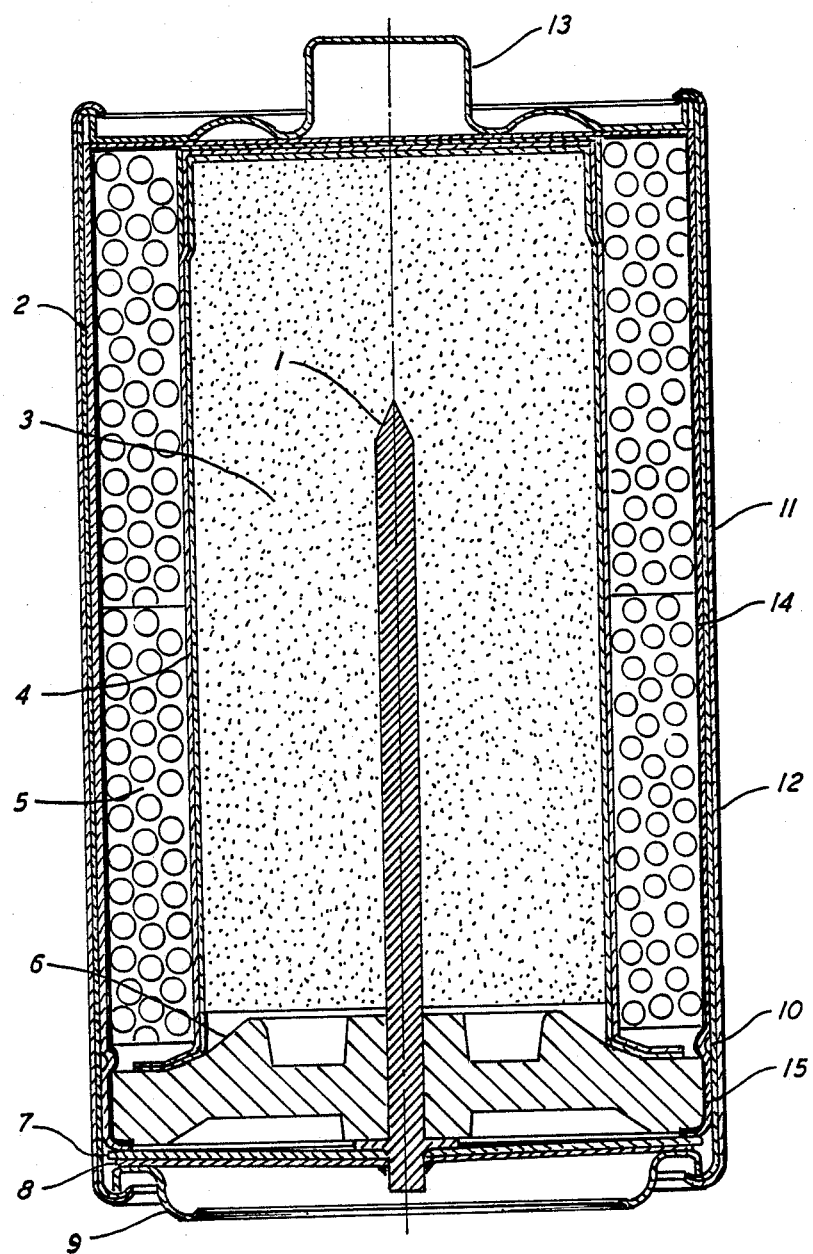
FIG. 1 is a drawing of an alkaline cylindrical battery incorporating this invention.
Figure 2:
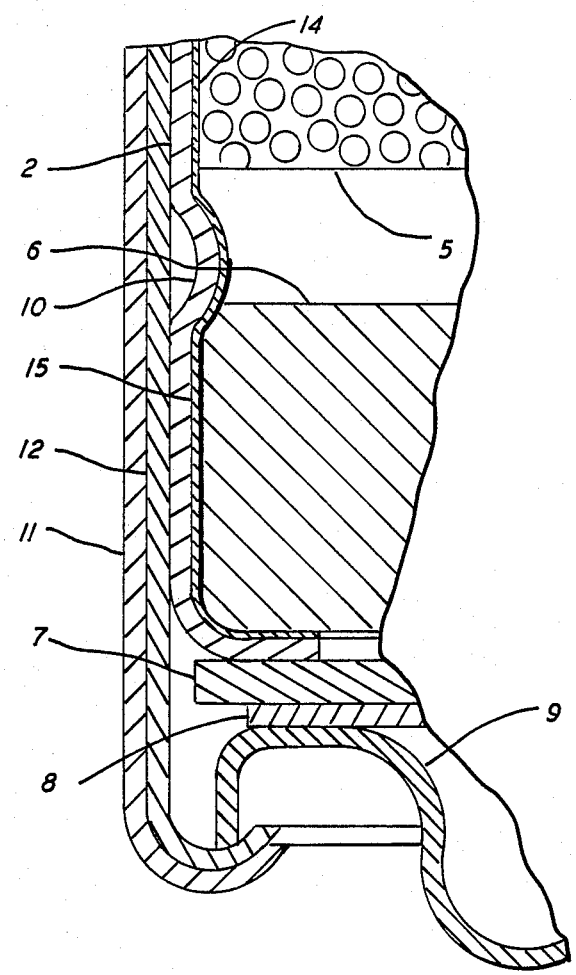
FIG. 2 is an enlarged drawing of the seal area of the alkaline cylindrical battery of FIG. 1.

FIG. 1 is a drawing of an alkaline cylindrical battery constructed according to the present invention. The positive current collector, a drawn steel container (2), open on one end and about 0.010 inches thick, has a conductive coating (14) applied to its interior surfaces. Two cathode annular rings (5) are placed in contact with the positive current collector. A bead (10) is formed into the container near the open end to support the sealing disk. A separator (4) and an anode (3) are placed inside of the cathode rings. A sealing disk (6) to which sealant (15) has been applied and containing a negative current collector (1) is placed into the open end of the container and in contact with the bead. The open end of the container is crimped over the sealing disk thus compressing it between the crimp of the container on to which the coating (14) has been applied and the bead to seal the cell. An insulation washer (7) with a central aperture is placed over the crimped end of the cell such that the end of the negative current collector (1) protrudes through the aperture. A contact spring (8) is affixed to the end of the negative current collector (1). Terminal caps (9) and (13) are placed into contact with the contact spring (8) and the positive current collector (2), respectively, and an insulating tube (12) and steel shell (11) are placed around the cell and crimped on their ends to hold the terminal caps in place.

Examples of the utility of the present invention will now be explained.

EXAMPLE 1

Three sets of adhesion test samples were prepared. The first set used a substrate of nickel-plated steel, the second set used a substrate of unplated steel, and the third set used a substrate of unplated steel coated with P-70 primer (a conductive plastic of PVC and carbon black in methyl ethyl ketone based solvent manufactured by Pervel Industries). On to each substrate, a metal washer with a 0.5" diameter opening was placed and a molten bitumen, Pioneer 135 (Witco Chemical Corp.), was poured inside the washer. The ⅜" diameter head of a bolt was then placed on the molten bitumen. These samples were then arranged in a tensile testing machine so that the force required to separate the bitumen from the substrate could be measured. The results in Table I show that the bond strength was improved by use of the P-70 primer. In Table I, the failure mode designation indicates the location of the separation. Cohesive failure is desired as this indicates that the weakest point of the bond is within the bitumen sealant itself, not at the metal/substrate surface, while adhesive failure, which indicates the weakest point of the bond is at the metal/substrate surface, is undesirable.

TABLE I

| 0° F. Adhesion Test Using Pioneer 135 Bitumen | | |
| --- | --- | --- |
| Substrate | Adhesion, lb/.5" dia. | Failure Mode |
| Nickel plated steel | 3.9 | Cohesive |
| Unplated steel | 2.4 | Adhesive |
| P-70 primed, unplated steel | 4.6 | Cohesive |

EXAMPLE 2

Two sets of alkaline manganese D-size cells were constructed using unplated steel cans as the positive current collector. The cans for the first set of batteries were not treated, while the metal containers used for the second set of batteries had their inner surfaces sprayed with P-70 primer. Batteries were then manufactured identically from the two sets of cans according to FIG. 1. The cells were leakage tested by subjecting them to a thermal shock cycle consisting of 8 hours at 130° F. followed by 16 hours at 0° F., for a total of three cycles. The outer wrap of each cell, consisting of the two terminal caps, the paper insulating tube, the insulating washer, the contact spring and the steel shell were then removed, and the number of cells with leakage between the sealing disks and the metal cans were counted. The data shown in Table II indicates that the present invention greatly improves the seal in alkaline cylindrical cells.

TABLE II

| Three 0° F.-130° F. Thermal Shocks | | |
|---|---|---|
| Can | Primer | % Leakage |
| Unplated steel | None | 100% |
| Unplated steel | P-70 | 0% |

EXAMPLE 3

A coating tack test, a modification of ASTM Standard D 2979, was conducted to compare the tackiness of P-70, a preferred coating material, and Macromelt 6238, a fatty polyamide having a maximum amine value of 2, such as described in Japanese Patent Application No. J5-4007-536. A solution of coating was deposited and dried on a face of two smooth metal blocks. The coated faces were then pressed together under a five pound weight for a set period of time. The coated faces were then placed in a force gauge and the force required to separate them was measured, thereby determining the tack strength. As shown in Table III, a coating of the present invention is virtually tack-free, while coatings comprised of fatty polyamides having a very low amine value exhibit a substantial degree of tack.

TABLE III

| | Coating Tack Test | | | |
|---|---|---|---|---|
| Coating Material | Test Area | Contact Time | Contact Force | Tack Strength |
| P70 | 0.25 in² | ½ hr. | 5 lbs. | 0 lbs. |
|  | 0.25 in² | 24 hr. | 5 lbs. | 0 lbs. |
| MACROMELT 6238 | 0.25 in² | ½ hr. | 5 lbs. | 1.4 lbs. |
|  | 0.25 in² | 24 hr. | 5 lbs. | 2.5 lbs. |

From the results in the foregoing examples and the referenced drawing, it is evident that the alkaline primary cells of this invention are superior to conventional alkaline primary batteries. While the foregoing examples used the alkaline $Mn_2O/Zn$ electrochemical system in a commercial cylindrical configuration, the present invention includes other alkaline electrochemical systems which use an electrolyte which is not corrosive to the positive current collector.

What is claimed:

1. An alkaline electrochemical cell having a sealing means comprised of a sealant disposed between a metallic container, which functions as a positive current collector, and a plastic seal member, wherein said metal container is provided with a hard, tackless conductive alkali-resistant plastic coating, said sealant contacting said plastic seal member and said plastic coating.

2. An alkaline electrochemical cell as in claim 1, wherein said sealant is bitumen.

3. An alkaline electrochemical cell as in claim 1, wherein said seal member is from the group consisting of polysulfone, polypropylene and nylon.

4. An alkaline electrochemical cell as in claim 1, wherein said metal container is unplated steel.

5. An alkaline electrochemical cell as in claim 1, wherein said hard, tackless conductive alkali-resistant plastic coating contains conductive fillers.

6. An alkaline electrochemical cell as in claim 5, wherein said conductive fillers are carbon.

7. An alkaline electrochemical cell as in claim 6, wherein the carbon weight percent of said hard, conductive alkali-resistant plastic coating ranges up to 40.

8. An alkaline electrochemical cell as in claim 6, wherein said conductive fillers are carbon particles selected from the group consisting of acetylene black, carbon black and graphite.

9. An alkaline electrochemical cell as in claim 1, wherein said hard, tackless conductive alkali-resistant plastic coating does not dissolve in the alkaline electrolyte.

10. An alkaline electrochemical cell as in claim 1, wherein said plastic coating is not oxided or hydolyzed in the alkaline electrolyte.

11. An alkaline electrochemical cell as in claim 1, wherein the hard, conductive alkali-resistant plastic coating is 0.0001 inches to 0.002 inches thick.

12. An alkaline electrochemical cell as in claim 11, wherein the hard, conductive alkali-resistant plastic coating is 0.0006 inches to 0.0008 inches thick.

13. A method of manufacture of an alkaline electrochemical cell which comprises:
   (a) coating the interior surface of the metallic container serving as the positive current collector with a conductive alkali-resistant polymeric resin;
   (b) drying the polymeric resin coating, thereby forming a hard, conductive alkali-resistant plastic film on the surface of said metallic container;
   (c) placing alkaline battery components within said metallic container;
   (d) providing a plastic seal member; and
   (e) sealing said alkaline cell by disposing a sealant between said plastic seal member and said hard, conductive alkali-resistant plastic film, and crimping the heretofore open end of said metal container.

14. A method as recited in claim 13, wherein said conductive alkaline-resistant polymeric resin comprises a polymeric binder dissolved in a solvent.

15. A method as recited in claim 14, wherein said solvent is evaporated from said alkaline-resistant polymeric resin at elevated temperatures.

16. A method as recited in claim 14, wherein said polymeric binder does not dissolve in alkaline electrolyte.

17. A method as recited in claim 14, wherein said polymeric binder is not hydrolyzed or oxidized by alkaline electrolyte.

18. A method as recited in claim 14, wherein said solvent wets the surface of said metallic container.

19. A method as recited in claim 13, wherein said sealant is bitumen.

20. A method as recited in claim 13, wherein said seal member is polypropylene or nylon.

21. A method as recited in claim 13, wherein said metal container is unplated steel.

22. A method as recited in claim 13, wherein said hard plastic film is 0.0001 inches to 0.002 inches thick.

23. A method as recited in claim 22, wherein said hard plastic film is 0.0006 inches to 0.0008 inches thick.

* * * * *